United States Patent
Kambrath et al.

(10) Patent No.: US 11,381,190 B2
(45) Date of Patent: Jul. 5, 2022

(54) TORSIONAL MODE DAMPING CONTROLLER

(71) Applicant: ROLLS-ROYCE plc, London (GB)

(72) Inventors: Jishnu K Kambrath, Derby (GB); Xiong Liu, Derby (GB); Youyi Wang, Derby (GB); Aaron A Ayu, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/140,538

(22) Filed: Jan. 4, 2021

(65) Prior Publication Data

US 2021/0218356 A1    Jul. 15, 2021

(30) Foreign Application Priority Data

Jan. 9, 2020 (GB) ..................................... 2000282

(51) Int. Cl.
*H02P 1/46* (2006.01)
*H02P 23/04* (2006.01)
(Continued)

(52) U.S. Cl.
CPC ............. *H02P 23/04* (2013.01); *B63H 21/17* (2013.01); *B64D 31/06* (2013.01); *B64D 35/02* (2013.01); *H02P 23/14* (2013.01); *H02P 27/06* (2013.01)

(58) Field of Classification Search
CPC .... H02P 23/04; H02P 6/08; H02P 6/28; H02P 27/06; B63H 21/17; B64D 31/06; B64D 35/02
See application file for complete search history.

(56) References Cited

U.S. PATENT DOCUMENTS

| 7,518,344 B2 | 4/2009 | Sihler |
| 7,847,526 B2 | 12/2010 | Tan et al. |

(Continued)

FOREIGN PATENT DOCUMENTS

| DE | 112019001688 T5 | * 12/2020 | ........ F16F 15/12366 |
| JP | 2018186616 A | * 11/2018 | |

OTHER PUBLICATIONS

Sugiura Koji, et al., "Vibration Suppression in 2- and 3-Mass System Based on the Feedback of Imperfect Derivative of the Estimated Torsional Torque", IEEE Transaction on Industrial Electronics, vol. 43, No. 1, Feb. 1996.
May 25, 2021 extended Search Report issued in European Patent Application No. 20214495.2.
Kambrath, J.K. et al., "Mitigation of Resonance Vibration Effects in Marine Propulsion," IEEE Transactions on Industrial Electronics, vol. 66, No. 8, pp. 6159-6169, Aug. 2019.
(Continued)

*Primary Examiner* — Karen Masih
(74) *Attorney, Agent, or Firm* — Oliff PLC (57) ABSTRACT

A torsional mode damping controller in which the controller modifies electrical power to an electrical motor to provide active damping control of torsional vibration in rotating masses. The controller receives a measurement of a rotational speed of the rotating masses $\omega_m$ and an estimate or a measurement of a torque transmitted between the rotating masses $T_{sh}$; based on the received transmitted torque $T_{sh}$, generate a compensating torque to suppress vibration $T_{com}$; based on the received rotational speed $\omega_m$ and the compensating torque $T_{com}$, generate an electromagnetic torque modification signal $T_{modi}$; and modify the electrical power provided to the electrical motor on the basis of the electromagnetic torque modification signal $T_{modi}$. The controller is further configured to generate compensating torque $T_{com}$ by applying a filter to the received transmitted torque $T_{sh}$, based on plural tunable parameters including a tuning gain K, a cut-off frequency $\omega_n$ and a resonant damping ratio $\zeta$.

17 Claims, 6 Drawing Sheets

(51) Int. Cl.
    *B63H 21/17*    (2006.01)
    *B64D 31/06*    (2006.01)
    *B64D 35/02*    (2006.01)
    *H02P 23/14*    (2006.01)
    *H02P 27/06*    (2006.01)

(56) References Cited

U.S. PATENT DOCUMENTS

| | | |
|---|---|---|
| 9,446,757 B2 | 9/2016 | Liang et al. |
| 2006/0244425 A1 | 11/2006 | Sihler |
| 2009/0085354 A1 | 4/2009 | Tan et al. |
| 2013/0200839 A1 | 8/2013 | Schramm et al. |
| 2017/0217332 A1 | 8/2017 | Hashimoto et al. |
| 2018/0079515 A1 | 3/2018 | Harwood et al. |
| 2018/0373221 A1 | 12/2018 | Nakamura et al. |
| 2019/0238077 A1 | 8/2019 | Azar et al. |

OTHER PUBLICATIONS

Girsang, I.P., et al., "Modeling and Control to Mitigate Resonant Load in Variable-Speed Wind Turbine Drivetrain," IEEE Journal of Emerging and Selected Topics in Power Electronics, vol. 1, No. 4, pp. 277-286, Dec. 2013.

Liu, L. et al., "Performance Comparison of Two Different Filter Design Approaches for Torsional Vibration Damping in a Doubly Fed Induction Generator-Based Wind Turbine," The Journal of Engineering, pp. 1-8.

Song-Manguelle, J. et al., "A General Approach of Damping Torsional Resonance Modes in Multi-Megawatt Applications," IEEE, pp. 772-779, 2010.

Kambrath, J.K. et al., "A Novel Control Technique to Reduce the Effects of Torsional Interaction in Wind Turbine System," IEEE Journal of Emerging and Selected Topics in Power Electronics, vol. 7, No. 3, pp. 2090-2105, Sep. 2019.

\* cited by examiner

TORSIONAL MODE DAMPING CONTROLLER

CROSS-REFERENCE TO RELATED APPLICATIONS

This specification is based upon and claims the benefit of priority from United Kingdom Patent Application Number 2000282.0, filed on 9 Jan. 2020, the entire contents of which are incorporated herein by reference.

TECHNICAL FIELD

The present disclosure relates to a torsional mode damping controller for an electro-mechanical system.

BACKGROUND

There is a continuing need for more efficient aircraft designs, in terms of structural efficiency (i.e. reducing the overall weight of the aircraft structure), aerodynamic efficiency (i.e. reducing the aerodynamic drag incurred during flight) and fuel efficiency (i.e. reducing the fuel required to perform a particular aircraft mission). One solution for increasing aircraft efficiency is to provide an aircraft driven by a hybrid mechanical-electrical, i.e. integrated, propulsion system.

In such an integrated propulsion system, a generator driven by a prime mover engine, for example a gas turbine engine, is employed to produce electrical power. This electrical power is provided to one or more propulsors, such as fans or propellers, which may be distributed about the aircraft, remote from the electrical generator. One such system is described in US 2018/0079515.

Integrated propulsion systems also have other fields of application, such as marine propulsion.

The prime mover engine in an integrated power system typically drives a generator, which in turn provides electrical power to power an electrical motor that drives a propulsor. A power electronics AC/DC/AC converter is connected between the generator and motor. Mechanical parts of such system are not rigidly connected. For example, on the engine and generator side, the engine rotating parts and generator rotor are connected through a mechanical transmission, and different rotating parts within the engine are also not rigidly connected. On the motor and propulsor side, the motor rotor and propulsor are connected through a mechanical transmission, which may include a gearbox. The mechanical connections in these transmissions produce a multi-rotating mass system, in which different masses are connected flexibly with different stiffnesses and damping coefficients. The multi-rotating mass system typically has resonance modes that can be excited in different transient conditions, e.g. caused by mismatches between engine and generator speeds or between motor and propeller speeds during dynamic conditions such as sudden electrical or mechanical load changes. These modes can lead to drivetrain over torque and can negatively affect lifetimes of drivetrain components such as shafts, gears, couplings and bearings.

Therefore, control techniques are used to protect driveline components against torsional vibrations and dynamic torques. Conventional active vibration damping schemes are based on electrical machine speed feedback at the resonant frequency, although this offers only small improvements in damping.

Figure 1:
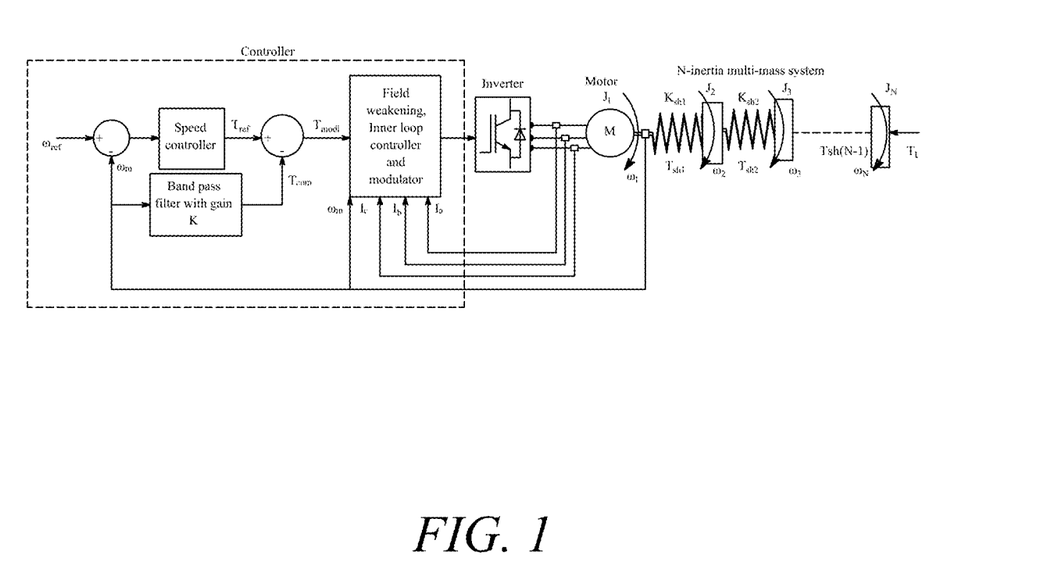
FIG. 1 shows a schematic block diagram of a conventional electrical machine speed feedback controller applied to an induction machine system driving an N-inertia multi-mass load.

For example, FIG. 1 shows a schematic block diagram of a conventional electrical machine speed feedback controller applied to an induction machine system driving an N-inertia multi-mass load. A nomenclature of terms is provided in the Annex to this description. The system has a power electronics AC/DC/AC converter in which a power inverter provides electrical power to an electrical motor M. The controller has a conventional, field weakening, inner loop controller and modulator that performs pulse width modulation (PWM) to produce gating signals for the inverter. An outer loop of the controller receives feedback from measured machine speed $\omega_m$ and sends a modified electromagnetic torque signal $T_{modi}$ to the inner loop controller.

The modified electromagnetic torque signal $T_{modi}$ is based on speed feedback. To separate out the speed component at the resonant frequency, a band pass filter tuned at the resonant frequency is provided. An advantage of using this approach is that there is no requirement for any additional sensor/estimation schemes within the driveline, although in order to tune the controller it is required to know about the mechanical system parameters as well as the first natural frequency.

Figure 2:
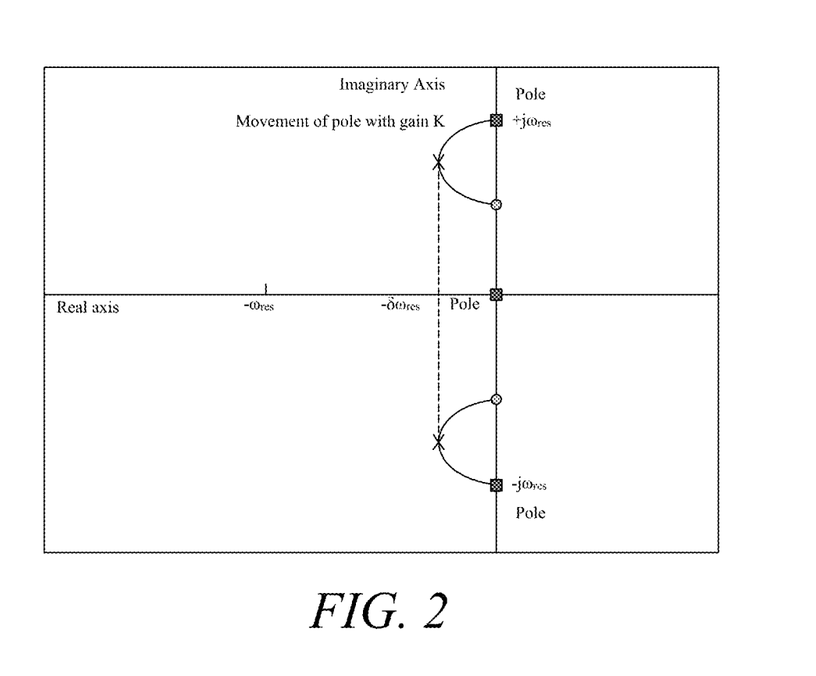
FIG. 2 shows a schematic root-locus diagram for the control logic of the controller of FIG. 1 applied to a 2-mass system.

A schematic root-locus diagram of this approach applied to a 2-mass system is shown in FIG. 2. Pole movement with controller gain is shown from the root-locus diagram. Using this approach, it is possible to achieve only small improvement in damping ratio and small reduction of initial peak over-torques. If the controller gain is wrongly selected, there can be further decreases in damping ratio.

Figure 3:
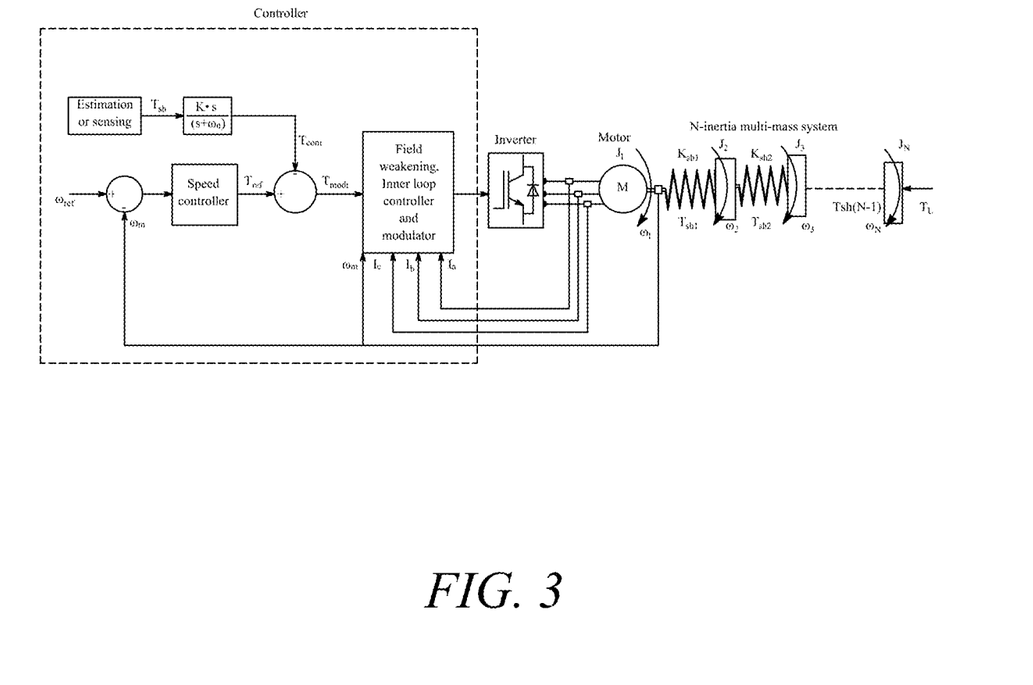
FIG. 3 shows a schematic block diagram applying a differentiator-based controller to an induction machine system driving an N-inertia multi-mass load.

K. Sugiura and Y. Hori, *Vibration suppression in 2- and 3-mass system based on the feedback of imperfect derivative of the estimated torsional torque*, IEEE Transactions on Industrial Electronics, vol. 43, pp. 56-64, 1996 propose a shaft torque differentiation approach based on an imperfect derivative filter for two and three-mass systems. FIG. 3 shows a schematic block diagram applying a controller of this type to an induction machine system driving an N-inertia multi-mass load.

Figure 4:
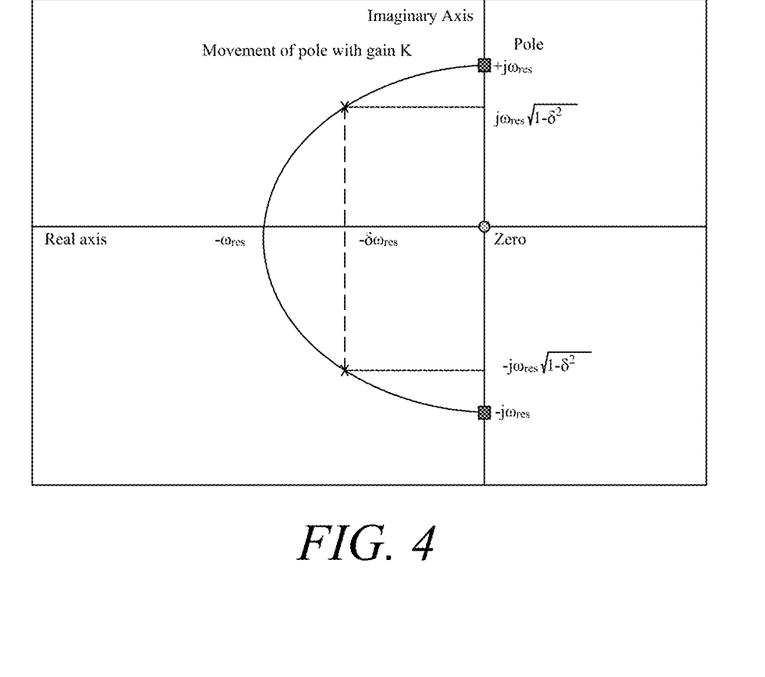
FIG. 4 shows a schematic root-locus diagram for the control logic of the controller of FIG. 3 applied to a 2-mass system.

This approach uses an imperfect differentiator, which is a high pass filter of the form $K \cdot s/(s+\omega_n)$ to differentiate an estimated or sensed value of the shaft torque $T_{sh}$. In this method two control variables are available for tuning the imperfect derivative filter i.e. K and $\omega_n$. A schematic root-locus diagram of this approach applied to a 2-mass system is shown in FIG. 4.

The approach can provide a better damping ratio as compared with the conventional approach of FIG. 1, but it has poor noise rejection abilities. The high pass filter used for differentiation tends to amplify measurement noises and disturbances. Also, most electro-mechanical systems are not exactly two mass or three mass systems, and hence it can be unclear which shaft torque is required for the control algorithm. In addition, the approach requires mechanical parameter information for tuning the controller as well as for estimation of shaft torque.

SUMMARY

The present disclosure relates to the protection of mechanical driveline components under torsional vibrations and dynamic torques in an electro-mechanical system, and aims to address at least some of the problems discussed above.

According to a first aspect there is provided a torsional mode damping controller for an electro-mechanical system in which power electronics provide electrical power to drive an electrical motor, and in which plural rotating masses, including a rotor of the electrical motor, are mechanically coupled to transmit torque therebetween, the controller modifying the electrical power provided to the electrical motor to provide active damping control of torsional vibration in the rotating masses, wherein the controller is configured to:
  receive a measurement of a rotational speed of the rotating masses $\omega_m$ and an estimate or a measurement of a torque transmitted between the rotating masses $T_{sh}$;
  based on the received transmitted torque $T_{sh}$, generate a compensating torque to suppress vibration $T_{com}$;
  based on the received rotational speed $\omega_m$ and the compensating torque $T_{com}$, generate an electromagnetic torque modification signal $T_{modi}$; and
  modify the electrical power provided to the electrical motor on the basis of the electromagnetic torque modification signal $T_{modi}$;
  wherein the controller is further configured to generate the compensating torque $T_{com}$ by applying a filter to the received transmitted torque $T_{sh}$, the filter being based on plural tunable parameters including a tuning gain K, a cut-off frequency $\omega_n$ and a resonant damping ratio $\zeta$.

Advantageously, the three degrees of freedom which are available in the controller enable improved damping performance of torsional modes and improved over-torque reduction. They also enhance capability to reject measurement noises and disturbances.

In a second aspect there is provided a method of torsional mode damping an electro-mechanical system in which power electronics provide electrical power to drive an electrical motor, and in which plural rotating masses, including a rotor of the electrical motor, are mechanically coupled to transmit torque therebetween, wherein the method includes modifying the electrical power provided to the electrical motor to provide active damping control of torsional vibration in the rotating masses by:
  receiving a measurement of a rotational speed of the rotating masses $\omega_m$ and an estimate or a measurement of a torque transmitted between the rotating masses $T_{sh}$;
  based on the received transmitted torque $T_{sh}$, generating a compensating torque to suppress vibration $T_{com}$;
  based on the received rotational speed $\omega_m$ and the compensating torque $T_{com}$, generating an electromagnetic torque modification signal $T_{modi}$; and
  modifying the electrical power provided to the electrical motor on the basis of the electromagnetic torque modification signal $T_{modi}$;
  wherein the compensating torque $T_{com}$ is generated by applying a filter to the received transmitted torque $T_{sh}$, the filter being based on plural tunable parameters including a tuning gain K, a cut-off frequency $\omega_n$ and a resonant damping ratio $\zeta$.

Thus the method of the second aspect corresponds to the controller of the first aspect.

The method of the second aspect may further include performing Eigen frequency analysis to identify a mechanical coupling between the rotating masses for estimation or measurement of the transmitted torque $T_{sh}$. Typically, this analysis is performed before the active damping control is commenced.

The controller of the first aspect and the method of the second aspect are typically computer-implemented. Accordingly, further aspects of the present disclosure provide: a computer program comprising code which, when the code is executed on a computer, causes the computer to perform the method of the second aspect; and a computer readable medium storing a computer program comprising code which, when the code is executed on a computer, causes the computer to perform the method of the second aspect.

Optional features of the present disclosure will now be set out. These are applicable singly or in any combination with any of the above aspects of the present disclosure.

The filter may provide an amplitude gain which is the value of the expression:

$$K \cdot s/(s^2 + 2\zeta\omega_n s + \omega_n^2)$$

where s is the Laplace complex frequency variable. Thus conveniently the amplitude of the compensating torque $T_{com}$ may be varied by varying the tuning gain K.

The filter may provide a phase lead which, at a natural resonant frequency for torsional vibration in the rotating masses (e.g. a first torsional mode), is at least 70 degrees, and preferably is at least 80 degrees. Conveniently the phase lead may be varied by varying the cut-off frequency $\omega_n$.

The controller may be further configured to determine a reference torque $T_{ref}$ by comparing the measured rotational speed $\omega_m$ with a reference rotational speed $\omega_{ref}$ and converting the result of the comparison into the reference torque $T_{ref}$. The electromagnetic torque modification signal $T_{modi}$ may then be generated by subtracting the compensating torque $T_{com}$ from the reference torque $T_{ref}$.

The controller may further have an inner loop which modifies the electrical power provided to the electrical motor on the basis of measurements of phase currents of the electrical power provided to the electrical motor $I_a$, $I_b$, $I_c$, the received rotational speed $\omega_m$, and the electromagnetic torque modification signal $T_{modi}$. For example, the inner loop may perform pulse width modulation (PWM) to produce gating signals for the inverter.

In a further aspect there is provided an electro-mechanical system having:
  power electronics which provide electrical power to drive an electrical motor;
  plural rotating masses, including a rotor of the electrical motor, the rotating masses being mechanically coupled to transmit torque therebetween; and
  the torsional mode damping controller of the first aspect which modifies the electrical power provided to the electrical motor to provide active damping control of torsional vibration in the rotating masses.

The electro-mechanical system may further include a sensor configured to sense a signal representative of torque on a mechanical coupling between two of the rotating masses, the sensed signal being used by the controller to form the estimate or measurement of the torque transmitted between the rotating masses $T_{sh}$.

The electro-mechanical system may further including a sensor configured to measure the rotational speed of the rotating masses $\omega_m$.

The power electronics may include a power inverter which provides the electrical power to drive the electrical motor, the controller modifying the electrical power provided by the power inverter.

The power electronics may include an AC/DC/AC converter providing a AC/DC rectifier and a DC link to the power inverter, the controller modifying the electrical power in the DC link to modify the electrical power provided by the power inverter.

The electro-mechanical system may further including a prime mover engine and a generator which is driven by the prime mover engine, the generator thereby producing electrical power which is provided to the power electronics to drive the electrical motor. For example, such an electro-mechanical system may be an aero propulsion system or a marine propulsion system. The aero propulsion system may have a prime mover engine (e.g. a gas turbine engine), a generator, power electronics, a motor, and a fan or propeller. The marine propulsion system may have a prime mover engine, a generator, power electronics, a motor, and a propeller.

BRIEF DESCRIPTION OF THE DRAWINGS

Embodiments will now be described by way of example only, with reference to the Figures, in which.

Aspects and embodiments of the present disclosure will now be discussed with reference to the accompanying figures. Further aspects and embodiments will be apparent to those skilled in the art.

DETAILED DESCRIPTION

Figure 5:
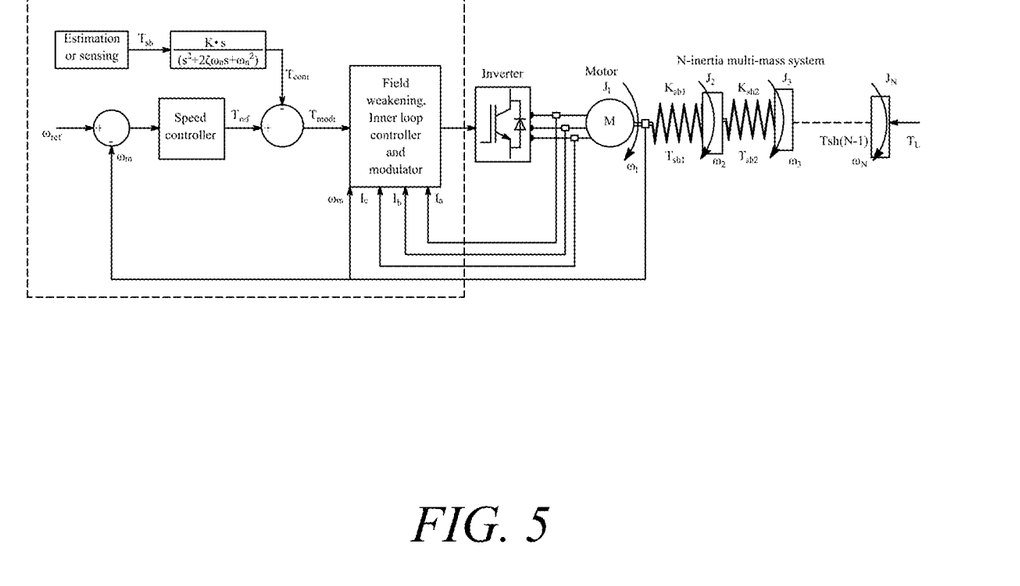
FIG. 5 shows a schematic block diagram of a resonant controller according to the present disclosure in the context of a three-phase induction motor system driving a multi-mass load.

FIG. 5 shows a schematic block diagram of a resonant controller according to the present disclosure in the context of a three-phase induction motor system driving a multi-mass load. The inverter of the system may be a power inverter of an AC/DC/AC converter, the controller modifying the electrical power in the DC link of the converter to modify the electrical power provided by the power inverter.

Figure 6:
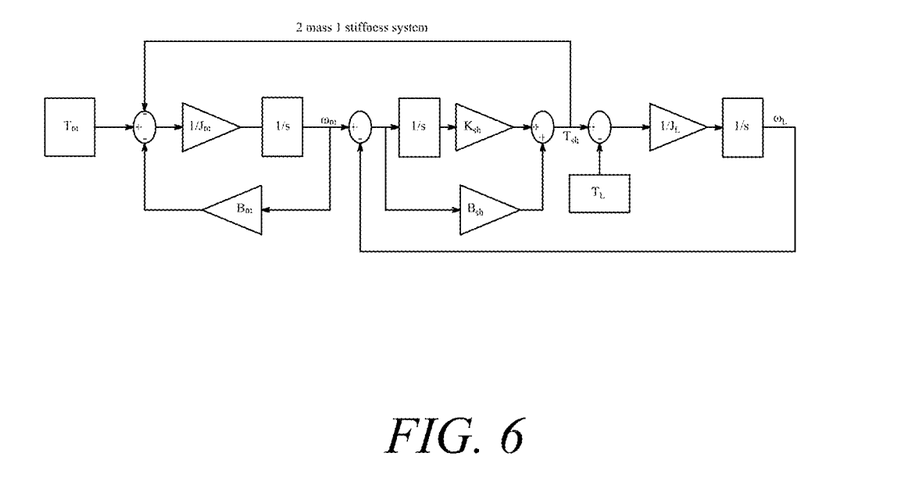
FIG. 6 shows a two mass representation of the mechanical part of the motor system of FIG. 5.

The mechanical part of this motor system can be represented as a two-mass system, as shown in FIG. 6, to represent the first natural frequency and to analyse the effectiveness of the control method. Assuming a frictionless system ($B_{sh}=0$, $B_m=0$) and a shaft inertia that is negligible compared to that of load inertia, the electro-mechanical system can be described in state-space form as:

$$\frac{d}{dt}\begin{pmatrix}\omega_m\\ \omega_L\\ T_{sh}\end{pmatrix}=\begin{pmatrix}0 & 0 & \frac{-1}{J_m}\\ 0 & 0 & \frac{1}{J_L}\\ K_{sh} & -K_{sh} & 0\end{pmatrix}\begin{pmatrix}\omega_m\\ \omega_L\\ T_{sh}\end{pmatrix}+\begin{pmatrix}\frac{1}{J_m} & 0\\ 0 & \frac{-1}{J_L}\\ 0 & 0\end{pmatrix}\begin{pmatrix}T_m\\ T_L\end{pmatrix} \quad (1)$$

From equation (1), the transfer function between shaft torque $T_{sh}$ and motor torque $T_m$ is found as:

$$\frac{T_{sh}}{T_m}=\frac{K_{sh}/J_m}{s^2+K_{sh}\frac{J_m+J_L}{J_m\times J_L}} \quad (2)$$

From the transfer function (2), it is seen that the system is undamped with a resonant frequency given by:

$$\omega_{res}=\sqrt{K_{sh}\frac{J_m+J_L}{J_m\times J_L}} \quad (3)$$

From (2), the motor electromagnetic torque $T_m$ can be expressed in terms of $T_{sh}$:

$$T_m=T_{sh}\frac{s^2+K_{sh}\frac{J_m+J_L}{J_m\times J_L}}{K_{sh}/J_m} \quad (4)$$

and adding a term of shaft torque differentiation (compensating torque) produces a reference torque $T_{ref}$:

$$T_{ref}=T_m+K\cdot sT_{sh}=T_{sh}\frac{s^2+K_{sh}\frac{J_m+J_L}{J_m\times J_L}}{K_{sh}/J_m}+K\cdot sT_{sh} \quad (5)$$

From (5), a modified electromagnetic torque $T_{modi}$ is generated by subtracting the compensating torque $T_{com}=K\cdot sT_{sh}$ from the reference torque $T_{ref}$. In the controller of FIG. 5, $T_{ref}$ is conveniently determined by a conventional speed controller from a reference rotational speed $\omega_{ref}$ and the measured machine rotational speed $\omega_m$.

The transfer function between shaft torque $T_{sh}$ and the reference torque $T_{ref}$ is thus:

$$\frac{T_{sh}}{T_{ref}}=\frac{K_{sh}/J_m}{s^2+K_{sh}\frac{J_m+J_L}{J_m\times J_L}+K\cdot s\frac{K_{sh}}{J_m}} \quad (6)$$

Figure 7:
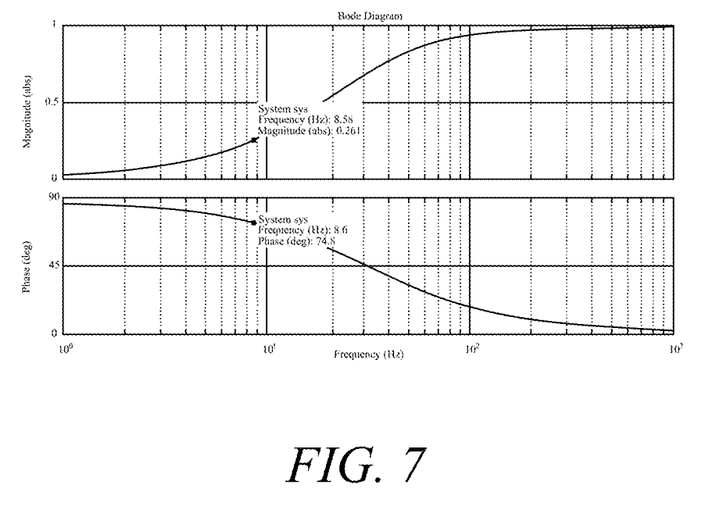
FIG. 7 is a Bode diagram illustrating characteristics of the differentiator-based controller of FIG. 3.

Introducing shaft torque differentiation through a gain K can effectively increase the system damping by adjustment of parameter K. This differentiation is the basis for the controller described above in respect of FIG. 3. The increase in damping ratio can be analysed by using the root-locus diagram shown in FIG. 4. The controller effectively converts the differentiation to an amplitude gain and 90 degree phase lead at the mechanical system natural frequency. However, an exact 90 degree phase lead is not practicable. It is possible to implement through an ideal differentiator, but this will also amplify high frequency noise due to a linear increase in amplitude gain with frequency. On the other hand, a phase angle close to 90 degree can provide damping, with performance increasing as the phase gain moves closer to 90 degrees. Such a phase lead and amplitude gains are implementable using a differentiator in series with a low pass filter of the form $K \cdot s/(s+\omega_n)$, and by tuning the gain K and the cut-off frequency $\omega_n$. FIG. 7 is a Bode diagram illustrating the characteristics of such a differentiator in series with a low pass filter. The cut-off frequency is 200 Hz. From the Bode diagram at the indicated mechanical natural frequency $\omega_{res}$ of 8.6 Hz, the phase gain is 74.8 degree.

However, such a differentiator in series with the low pass filter behaves as a high pass filter which produces a high constant gain at high frequencies. Thus measurement noise and disturbances are poorly suppressed at these frequencies.

Figure 8:
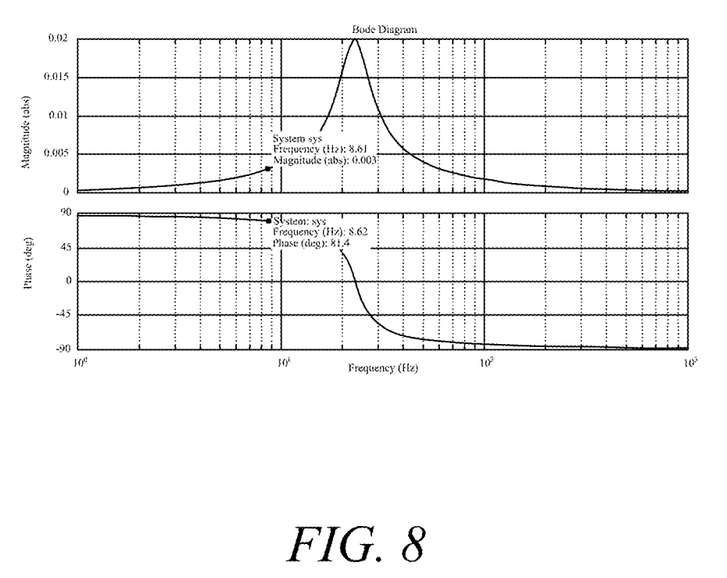
FIG. 8 is a Bode diagram illustrating characteristics of the resonant controller of FIG. 5.

Better performance is achieved by the resonant controller of FIG. 5, having a filter of the form $K \cdot s/(s^2+2\zeta\omega_n s+\omega_n^2)$. In this controller, three degrees of freedom are available. The filter is based on the $K \cdot s$ differentiator term which produces the compensating torque $T_{com}$, but replacing $K \cdot s$ with $K \cdot s/(s^2+2\zeta\omega_n s+\omega_n^2)$. The amplitude gain of the filter can be achieved by the tuning gain K, and a phase gain very near to 90 degree can be achieved using the damping ratio $\zeta$ and the natural (cut-off) frequency $\omega_n$. FIG. 8 is a Bode diagram for the controller having a controller frequency $\omega_n$ of 23 Hz, the mechanical natural frequency $\omega_{res}$ being again 8.6 Hz. From the diagram it is clear that the controller has only a small high frequency gain. Also at the system natural frequency the phase gain is 81.4 degree, which is closer to 90 degree compared to the differentiator of FIG. 3.

The damping can be increased by increasing the tuning gain K.

Changes in mechanical parameters such as inertia and shaft stiffness change the natural frequency of the mechanical system $\omega_{res}$. If $\omega_{res}$ moves closer to the controller natural frequency $\omega_n$ damping performance reduces since the phase gain shifts away from 90 degrees. Conversely, if $\omega_{res}$ moves away from $\omega_n$ damping performance improves as the phase gain move more towards 90 degree. Thus the controller natural frequency is generally tuned to a frequency which is sufficiently different from the mechanical system natural frequency, i.e. to produce a desired phase gain.

The damping ratio $\zeta$ can be tuned according to the system damping performance requirements, inverter sizing, DC-link capacitor sizing etc.

In addition, the resonant controller can achieve the highest improvement in damping ratio shown in the root-locus diagram of FIG. 4. Specifically, the controller allows the system poles to be moved to the far left-hand side. Hence initial peak over-torques induced by of torsional oscillations can also be reduced by the controller.

In FIG. 5, the controller is shown being used for speed control. However, the controller can also be used for torque control. In torque control mode, $T_{ref}$ is provided by the user rather than being based on $\omega_{ref}$ and $\omega_m$. Advantageously, the controller can prevent excitation of the system resonance under a step change in $T_{ref}$.

For multi-mass, electro-mechanical systems having multiple shaft torque amplitudes, identification of which shaft torque to use as an input to the resonant controller can be obtained by Eigen frequency analysis. This identifies the masses which are moving in antiphase to each other at the first natural frequency. Each shaft torque between these masses can then be used as the input control variable $T_{sh}$. In particular, if more than one shaft is resonating, the controller can determine a compensating torque to suppress vibration $T_{com}$ for each resonating shaft and subtract each $T_{com}$ from the reference torque $T_{ref}$.

Normally, for multi rotating mass system, after mode shape analysis, the first mode which has the lowest resonance frequency is found to have the largest torque oscillation amplitude, and this mode is selected for damping. However, the controller is not limited to damping the first mode, and can be extended to provide suppression of further shaft torque oscillations.

Figure 9:
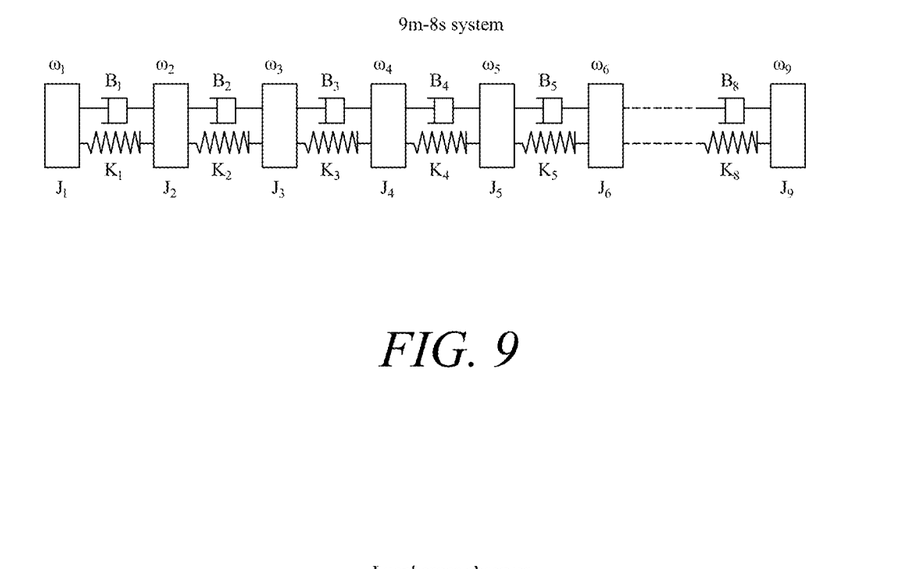
FIG. 9 shows schematically a nine mass, eight stiffness multi-mass system.
Figure 10:
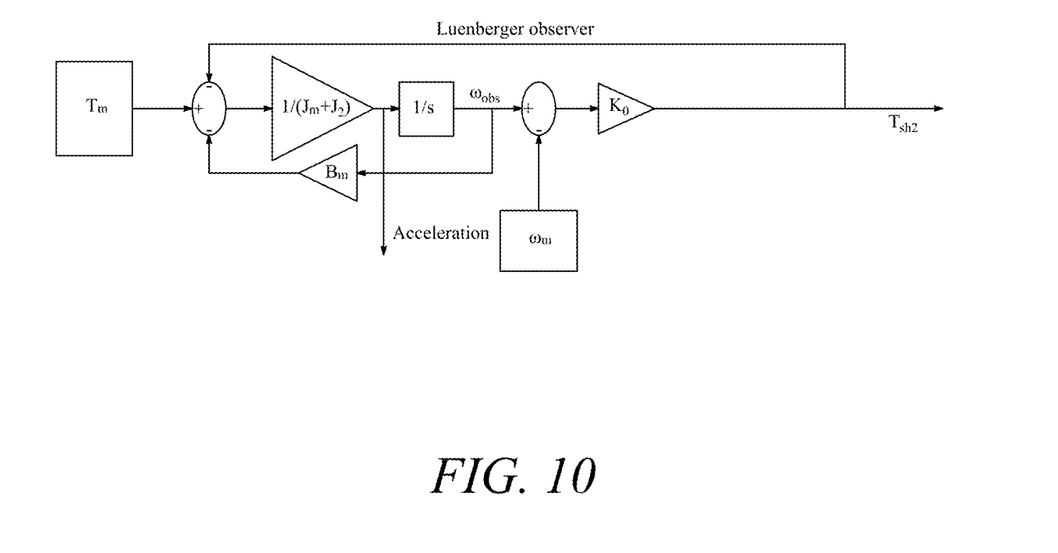
FIG. 10 shows a block diagram of a torque estimator.

To demonstrate the effectiveness of the resonant controller, it was used to simulate vibration damping of an azimuth propulsion system, represented as a simplified nine-mass, eight-stiffness multi-mass system shown schematically in FIG. 9. By performing Eigen frequency analysis, it was identified that torsional twisting occurs between Mass 2 and Mass 3 at the first natural frequency. Hence torque information from Shaft 2 was used for the control variable $T_{sh}$. The Shaft 2 torque information was obtained by using both direct shaft torque sensing using a torque sensor and shaft toque estimation methods. A block diagram of the Shaft 2 torque estimator is shown in FIG. 10. The linkage between Mass 1 and Mass 2 was very stiff, such that Mass 1 and Mass 2 could be combined as a single mass (thus in the block diagram, $J_m=J_1$). The estimator equation is:

$$T_m = (J_m + J_2)\frac{d\omega_m}{dt} + B\omega_m + T_{sh2} \quad (7)$$

From this equation it is possible to estimate $T_{sh2}$ if $T_m$ and $\omega_m$ are known. The proposed estimator is simple and does not have higher states.

The damping by the controller was simulated at rapid ventilation conditions where the propeller load torque suddenly reduces and regains the full value at times t=7 s, 12 s and 15 s. For time period 0 s<t<11 s, the system was operating without active vibration control. Control based on shaft torque sensing was switched on for the period 11 s<t<14.5 s, and control based on shaft torque estimation was switched on for the period 14.5 s<t<20 s.

Figure 11:
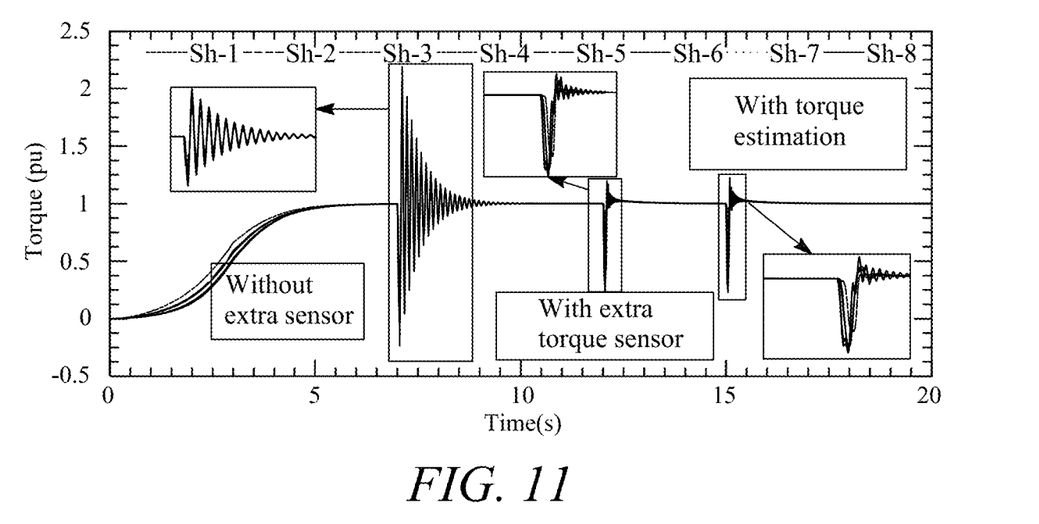
FIG. 11 shows shaft torque in the driveline of FIG. 9 plotted against time.
Figure 12:
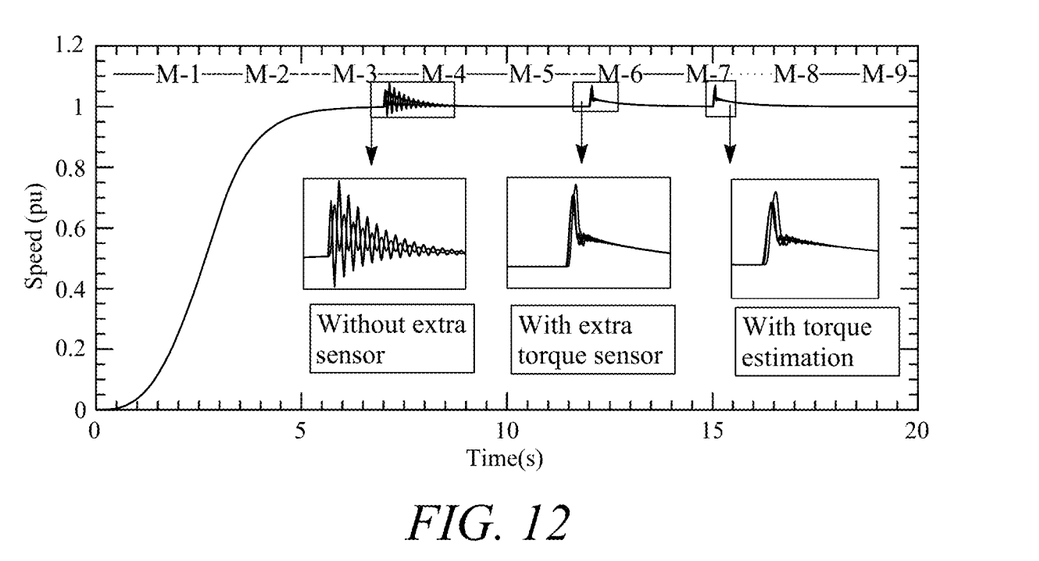
FIG. 12 shows mass speeds in the driveline of FIG. 9 plotted against time.

FIG. 11 shows the shaft torque in the driveline plotted against time. Without active vibrational damping solution, the shaft over-torque reached 2.1 times the full load torque and oscillations persisted for a duration of about 2 s. Control based on shaft torque sensing as well as on shaft torque estimation provided similar levels of performance in both initial over-torque reduction as well as oscillation duration reduction. FIG. 12 shows the corresponding mass speeds in the driveline plotted against time. Control based on shaft torque sensing as well as on shaft torque estimation provided similar reductions of torsional twisting between Mass 2 and Mass 3.

Thus the controller can provide effective protection for sensitive mechanical system components (such as couplings, bearings, gears) under torsional vibrations and dynamic torques in multi-mass electro-mechanical systems. When sudden load changes occur, the controller identifies over-torque and torsional vibration and produces a compensating torque as a differentiator output of shaft torque. The control logic is only active when torsional oscillations are present. Advantages of the resonant controller are:

1. Improved damping performance of torsional modes and improved over-torque reduction.
2. Improved noise rejection capability.
3. Relative insensitivity to variations in mechanical parameters.
4. Similar performance as between actual torque sensing and torque estimation.
5. Applicability to multi-mass drivetrain systems, shaft torque information used as an input for the controller being determinable by an Eigen frequency analysis.

Although described above in the context of a motor drive system, the controller can also be used in a system having a prime mover-driven electrical generator with active rectification conversion. The generator torque can then be controlled through the rectifier to reduce torsional vibration.

This controller can also be integrated into different electrical machines, such as induction machines, permanent magnet synchronous machines, brush-less synchronous machines etc. The power electronic converter can also have different types of inverters, controllable rectifiers, matrix converters, etc.

Moreover the controller can be applied in various fields of application that use electro-mechanical energy conversion and power electronic converter systems. Thus the controller can be used in industrial drives, servo drives, automobile systems and wind turbines etc. In particular potential applications can be found in aerospace hybrid electrical propulsion systems, marine propulsion systems, land hybrid power train systems, and aero starter generator systems.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

Annex

Nomenclature
$\omega_m$ ... Measured machine speed
$\omega_L$ ... Load speed
$\omega_{ref}$ ... Machine reference speed
$\omega_n$ ... Controller natural frequency (Cut-off frequency)
$\omega_{res}$ ... Resonant frequency of mechanical system (First natural frequency)
$T_{modi}$ ... Modified electromagnetic torque
$T_{ref}$ ... Reference torque
$T_{com}$ ... Compensating torque to suppress vibration
$T_{sh}$ ... Shaft torque
$T_m$ ... Machine electromagnetic torque
$T_L$ ... Load torque
$J_m$ ... Machine inertia
$J_L$ ... Load inertia
$B_{sh}$ ... Shaft material damping
$B_m$ ... Viscous friction coefficient
$\delta$ ... Damping ratio of the mechanical system by active control
$\zeta$ ... Resonant Controller damping ratio
$K_{sh}$ ... Shaft stiffness
K ... Controller gain
$I_a, I_b, I_c$ ... Phase currents of the electrical machine
$J_1, J_2, J_3, \ldots J_N$ ... Inertias in the N-inertia multi mass system
$K_{sh1}, K_{sh2}, \ldots K_{sh(N-1)}$ ... Stiffness in the N-inertia multi mass system
$\omega_1, \omega_2, \omega_3, \ldots \omega_N$ ... Angular speeds in the N-inertia multi mass system
$T_{sh1}, T_{sh2}, T_{sh3}, \ldots T_{sh(N-1)}$ Shaft torques in the N-inertia multi-mass system
$K_o$ ... Observer gain
s ... Laplace complex frequency variable

The invention claimed is:

1. A torsional mode damping controller for an electromechanical system in which power electronics provide electrical power to drive an electrical motor, and in which plural rotating masses, including a rotor of the electrical motor, are mechanically coupled to transmit torque therebetween, the controller modifying the electrical power provided to the electrical motor to provide active damping control of torsional vibration in the rotating masses, wherein the controller is configured to:
receive a measurement of a rotational speed of the rotating masses $\omega_m$ and an estimate or a measurement of a torque transmitted between the rotating masses $T_{sh}$;
based on the received transmitted torque $T_{sh}$, generate a compensating torque to suppress vibration $T_{com}$ by applying a filter to the received transmitted torque $T_{sh}$, the filter being based on plural tunable parameters including a tuning gain K, a cut-off frequency $\omega_n$ and a resonant damping ratio $\zeta$, the filter providing a phase lead which, at a natural resonant frequency for torsional vibration in the rotating masses, is at least 70 degrees;
based on the received rotational speed $\omega_m$ and the compensating torque $T_{com}$, generate an electromagnetic torque modification signal $T_{modi}$; and
modify the electrical power provided to the electrical motor based on the electromagnetic torque modification signal $T_{modi}$.

2. The torsional mode damping controller according to claim 1, wherein the filter provides an amplitude gain which is the value of the expression:

$$K \cdot s/(s^2+2\zeta\omega_n s+\omega_n^2)$$

where s is the Laplace complex frequency variable.

3. The torsional mode damping controller according to claim 1, wherein the controller is further configured to determine a reference torque $T_{ref}$ by comparing the received rotational speed $\omega_m$ with a reference rotational speed $\omega_{ref}$ and converting the result of the comparison into the reference torque $T_{ref}$, and wherein the electromagnetic torque modification signal $T_{modi}$, is generated by subtracting the compensating torque $T_{com}$ from the reference torque $T_{ref}$.

4. The torsional mode damping controller according to claim 1, further having an inner loop which modifies the electrical power provided to the electrical motor based on measurements of phase currents of the electrical power provided to the electrical motor $I_a$, $I_b$, $I_c$, the received rotational speed $\omega_m$, and the electromagnetic torque modification signal $T_{modi}$.

5. The torsional mode damping controller according to claim 1, wherein the controller is further configured to perform Eigen frequency analysis to identify a mechanical coupling between the rotating masses for estimation or measurement of the transmitted torque $T_{sh}$.

6. An electro-mechanical system having:
power electronics which provide electrical power to drive an electrical motor;
plural rotating masses, including a rotor of the electrical motor, the rotating masses being mechanically coupled to transmit torque therebetween; and
the torsional mode damping controller of claim 1 which modifies the electrical power provided to the electrical motor to provide active damping control of torsional vibration in the rotating masses.

7. The electro-mechanical system according to claim 6 further including either or both of:
a sensor configured to sense a signal representative of torque on a mechanical coupling between two of the rotating masses, the sensed signal being used by the controller to form the estimate or measurement of the torque transmitted between the rotating masses $T_{sh}$, and
a sensor configured to measure the rotational speed of the rotating masses $\omega_m$.

8. The electro-mechanical system according to claim 6, wherein the power electronics include a power inverter which provides the electrical power to drive the electrical motor, the controller modifying the electrical power provided by the power inverter.

9. The electro-mechanical system according to claim 8, wherein the power electronics include an AC/DC/AC converter providing a AC/DC rectifier and a DC link to the power inverter, the controller modifying the electrical power in the DC link to modify the electrical power provided by the power inverter.

10. The electro-mechanical system according to claim 6 further including a prime mover engine and a generator which is driven by the prime mover engine, the generator thereby producing electrical power which is provided to the power electronics to drive the electrical motor.

11. The electro-mechanical system according to claim 10 which is an aero propulsion system or a marine propulsion system.

12. A method of torsional mode damping an electro-mechanical system in which power electronics provide electrical power to drive an electrical motor, and in which plural rotating masses, including a rotor of the electrical motor, are mechanically coupled to transmit torque therebetween, wherein the method includes modifying the electrical power provided to the electrical motor to provide active damping control of torsional vibration in the rotating masses by:
receiving a measurement of a rotational speed of the rotating masses $\omega_m$ and an estimate or a measurement of a torque transmitted between the rotating masses $T_{sh}$;
based on the received transmitted torque $T_{sh}$, generating a compensating torque to suppress vibration $T_{com}$ by applying a filter to the received transmitted torque $T_{sh}$, the filter being based on plural tunable parameters including a tuning gain K, a cut-off frequency $\omega_n$ and a resonant damping ratio $\zeta$, and the filter providing a phase lead which, at a natural resonant frequency for torsional vibration in the rotating masses, is at least 70 degrees;
based on the received rotational speed $\omega_m$ and the compensating torque $T_{com}$, generating an electromagnetic torque modification signal $T_{modi}$; and
modifying the electrical power provided to the electrical motor based on the electromagnetic torque modification signal $T_{modi}$.

13. The method according to claim 12, wherein the filter provides an amplitude gain which is the value of the expression:

$$K \cdot s/(s^2+2\zeta\omega_n s+\omega_n^2)$$

where s is the Laplace complex frequency variable.

14. The method according to claim 12, wherein the method further comprises determining a reference torque $T_{ref}$ by comparing the received rotational speed $\omega_m$ with a reference rotational speed $\omega_{ref}$ and converting the result of the comparison into the reference torque $T_{ref}$, and wherein the electromagnetic torque modification signal $T_{modi}$ is generated by subtracting the compensating torque $T_{com}$, from the reference torque $T_{ref}$.

15. The method according to claim 12, wherein the method further comprises modifying the electrical power provided to the electrical motor based on measurements of phase currents of the electrical power provided to the electrical motor $I_a$, $I_b$, $I_c$, the received rotational speed $\omega_m$, and the electromagnetic torque modification signal $T_{modi}$.

16. The method according to claim 12, wherein the method further includes performing Eigen frequency analysis to identify a mechanical coupling between the rotating masses for estimation or measurement of the transmitted torque $T_{sh}$.

17. A non-transitory computer readable medium storing a computer program comprising code which, when the code is executed on a computer, causes the computer to perform the method of claim 12.

* * * * *